INVENTOR
MAURICE GRAHAM
ATTORNEYS

Dec. 11, 1934.  M. H. GRAHAM  1,984,063
AUTOMATIC TOASTER
Filed Oct. 7, 1931  7 Sheets-Sheet 2
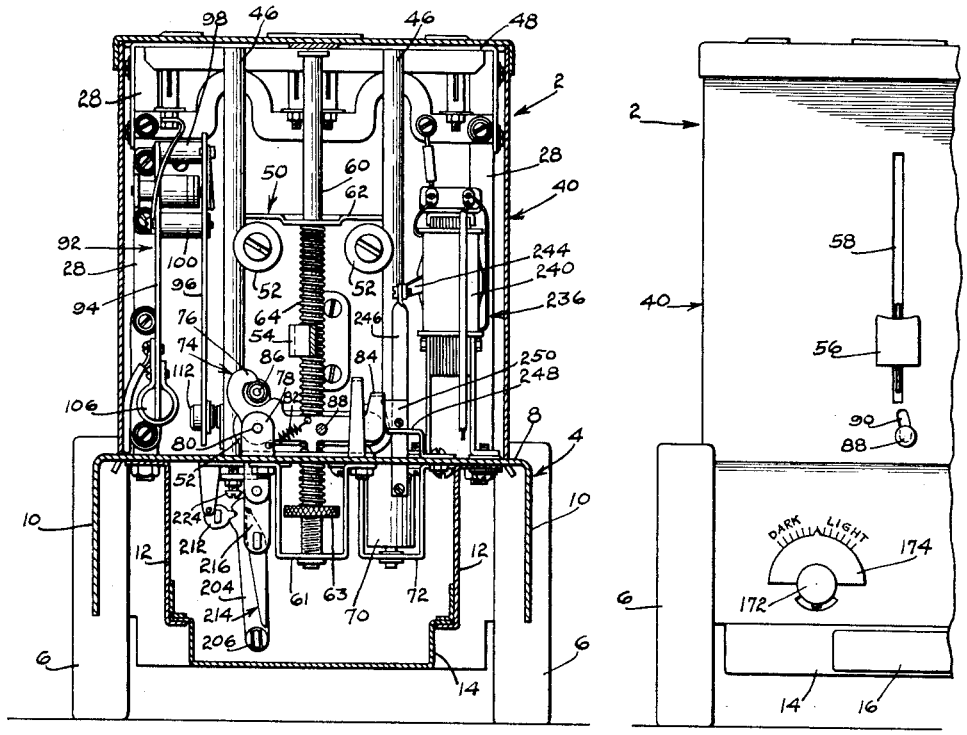
Fig.3
Fig.5
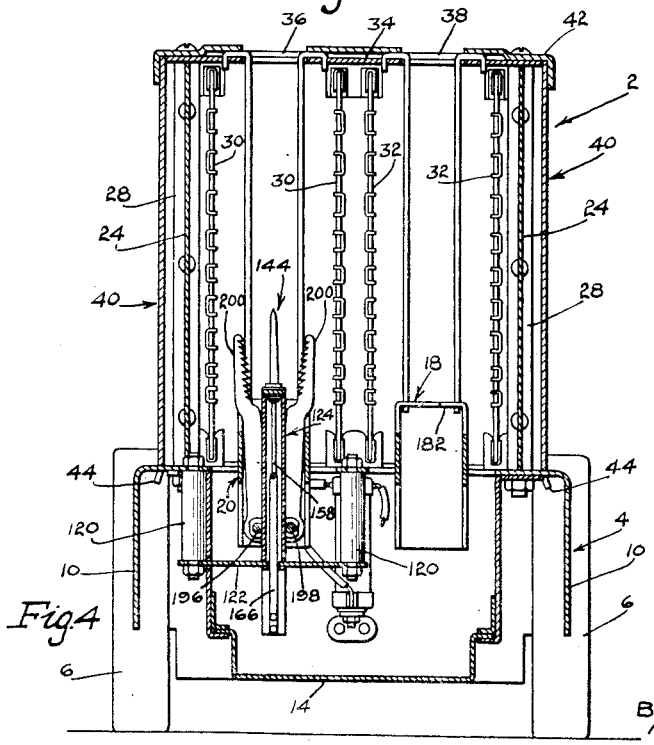
Fig.4
INVENTOR
MAURICE GRAHAM
By Paul, Paul & Moore
ATTORNEYS Dec. 11, 1934.    M. H. GRAHAM    1,984,063
AUTOMATIC TOASTER
Filed Oct. 7, 1931    7 Sheets-Sheet 3
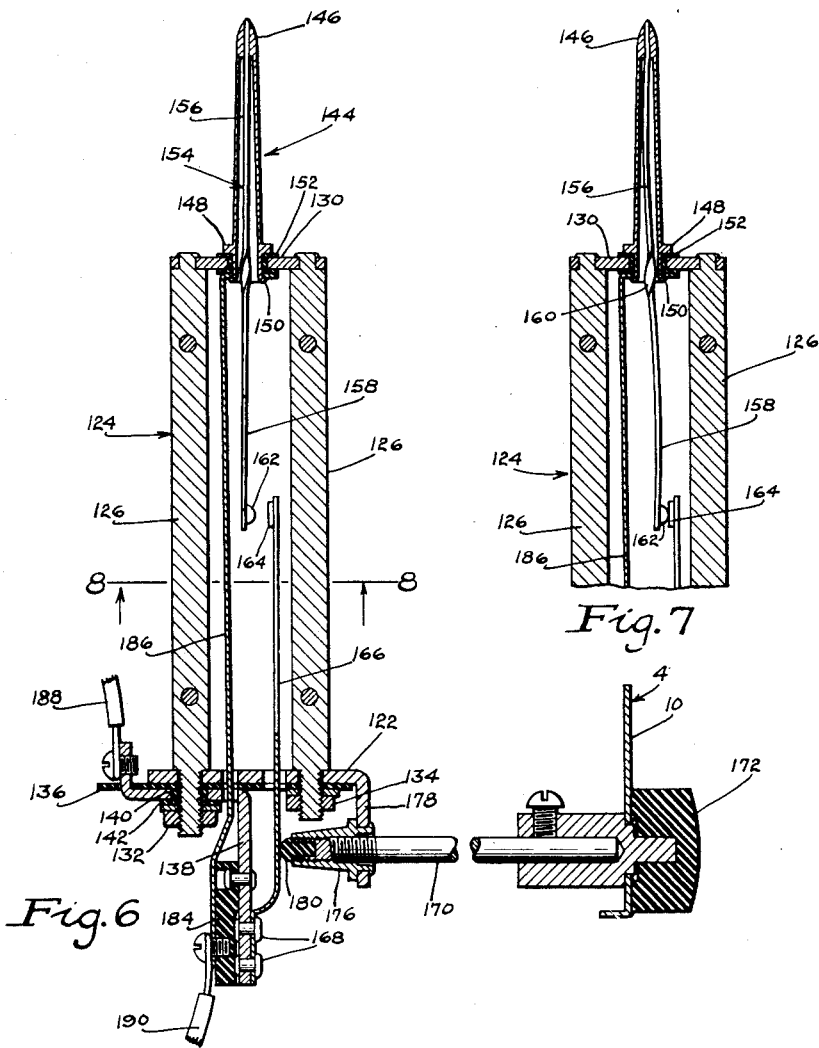
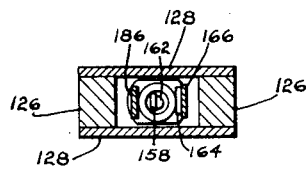
INVENTOR
MAURICE GRAHAM
By Paul, Paul Moore
ATTORNEYS Dec. 11, 1934.                M. H. GRAHAM                1,984,063
                             AUTOMATIC TOASTER
                           Filed Oct. 7, 1931           7 Sheets-Sheet 4

INVENTOR
MAURICE GRAHAM
By Paul, Paul Moore
ATTORNEYS

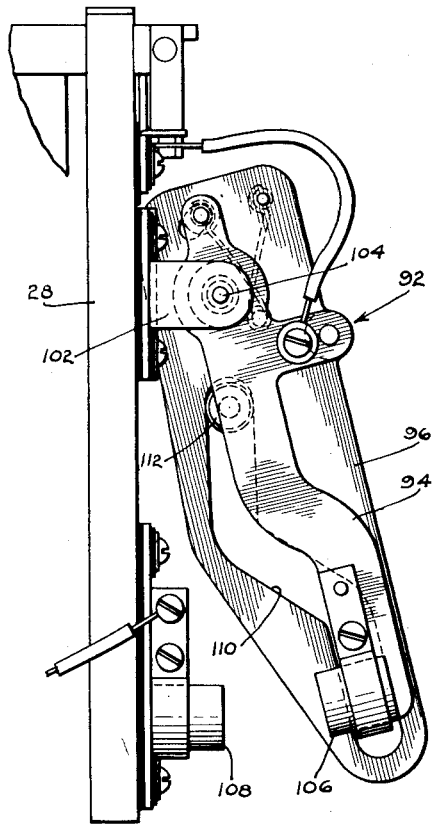
Fig.14
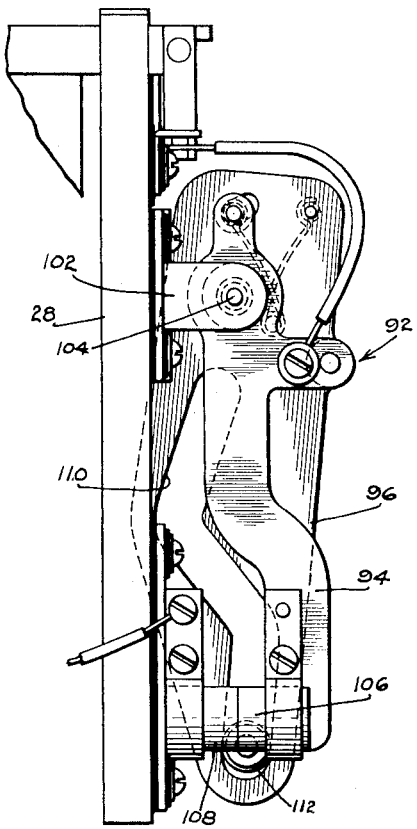
Fig.15
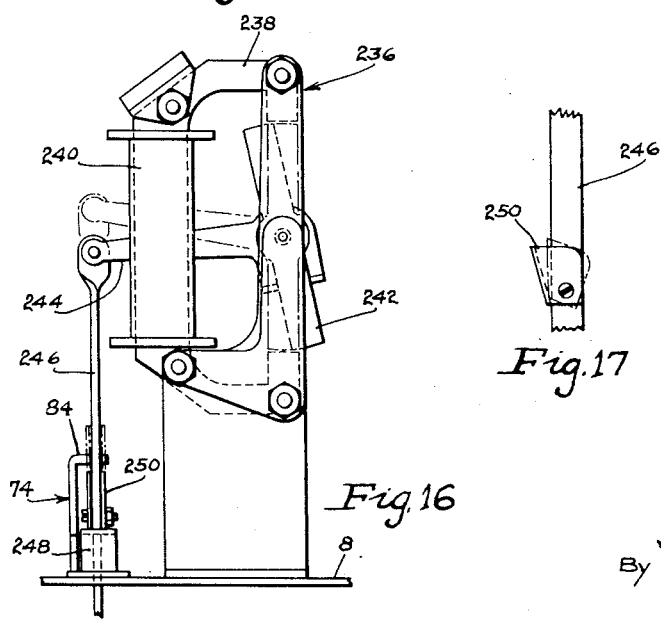
Fig.16
Fig.17
INVENTOR
MAURICE GRAHAM
By Paul, Paul & Moore
ATTORNEYS Dec. 11, 1934.  M. H. GRAHAM  1,984,063
AUTOMATIC TOASTER
Filed Oct. 7, 1931  7 Sheets-Sheet 7

INVENTOR
MAURICE GRAHAM
ATTORNEYS

Patented Dec. 11, 1934

1,984,063

UNITED STATES PATENT OFFICE 1,984,063

AUTOMATIC TOASTER

Maurice H. Graham, St. Louis Park, Minn.

Application October 7, 1931, Serial No. 567,427

52 Claims. (Cl. 219—19)

This invention concerns itself with toasters and more particularly with bread toasters which are automatically operative to control the toasting operation.

Automatic toasters have heretofore been known in which the toasting operation is controlled by a clockwork or timing mechanism having means associated therewith for either controlling the operation of the heating means, moving the bread slice being toasted away from the heating means, moving the heating means away from the bread slice, or combining any of these operations. The performance of these operations further serves as a signal to the operator to indicate the completion of the toasting operation. In automatic toasters of this general character, the timing mechanism is set in operation upon insertion of a bread slice to be toasted and times the interval of the toasting operation. In what might perhaps be termed the most successful type of automatic toaster heretofore developed, there are provided means for inserting a bread slice and at the same time rendering the heating means operative and setting the clockwork in operation, together with means for ejecting the slice and rendering the heating means inoperative at the expiration of a given time interval determined by the clockwork.

In the purely automatic operation of a toaster of this type, each bread slice remains in the toaster for the same interval of time irrespective of the temperature conditions prevailing at the outset of the individual toasting operation. Thus, where a number of bread slices are successively toasted, the temperature prevailing within the toaster at the beginning of the toasting of the first slice is room temperature. The temperature prevailing at the beginning of the second slice will be appreciably higher and the temperature will be higher still when the third and fourth slices are reached. Consequently, the mean temperature of the toaster during the toasting of the first slice will be substantially lower than the mean temperature during the toasting of one of the succeeding slices and inasmuch as the time intervals are the same for each slice, the various slices will receive varying amounts of heat. Accordingly, the later slices will be appreciably darker than the earlier ones regardless of having been in the toaster for equal time intervals. Successive bread slices can therefore not be entirely uniformly toasted automatically in such a toaster.

Toasters of this type have been provided with means for manually regulating the clockwork. The time interval for each bread slice may thereby be varied in an effort to obtain uniform toasting but this renders the toaster non-automatic. Moreover, it is extremely difficult if not entirely impossible to accurately compensate for varying initial toaster temperatures by manual adjustment.

It has heretofore been proposed to automatically control a toaster by thermally responsive means exposed directly to the heat of the oven. In a proposed toaster of this type there is provided a thermo-bar which is adapted to engage the surface of a bread slice being toasted and is arranged to lie between the bread slice and a radiant heating element during the toasting operation. Accordingly, the thermo-bar is chiefly affected by the heat radiated directly from the heating elements even though it should contact the surface of the bread and uniform toasting is not obtained, for a bread slice, in order to be properly toasted, must not merely be held in an oven until an arbitrarily selected oven temperature is reached but must be maintained exposed to the heat during a given interval of time for any given mean temperature. Again, it is difficult to obtain good contact between a bread slice and the thermo-bar.

In the course of my experiments I have observed that the temperatures of the insides of slices of bread toasted to a uniform degree in any given toaster, are substantially equal when such degree of toasting is reached, irrespective of variations of initial oven temperatures for the various slices, such as occur when starting at room temperature and toasting a number of slices in succession. In other words, it has been my observation that a slice of bread placed into an oven having one initial temperature and maintained in such oven until toasted to a predetermined degree, will have at the instant of reaching such predetermined degree an inside temperature substantially equal to the inside temperature of another slice of bread which has reached such a degree of toasting after having been placed in the oven while at a different initial temperature.

It is a general object of the invention to provide in an automatic toaster, means responsive to the temperature of the inside of a slice of bread being toasted for controlling the toasting thereof.

In accordance with the invention I provide in a toaster a thermally responsive device which is adapted to pierce and become embedded in a bread slice to be toasted, and it is a further object of the invention to provide means for embedding the thermally responsive device in the bread slice.

Again, it is a more specific object to provide such embedding means which are simple and positive in operation, which serve to guide and position the bread slice in which the thermally responsive device is to be inserted, and which do not interfere with the toasting operation.

Upon the toasting of a number of bread slices, in successive operations having time intervals therebetween of insufficient duration to allow the toaster to cool, it has been observed that some error in timing occurs due to variations in temperature of the thermally responsive device at the beginning of the toasting of each slice, for the time lag between the instant when the interior of the bread reaches a predetermined temperature and the thermally responsive device reaches the same temperature will vary depending upon the difference between the starting temperatures of the bread and thermally responsive device. So also, the thermally responsive device when hot helps to heat the bread more quickly.

It is a further object of the invention to provide means for compensating for this error in timing.

The various objects of the invention will become more readily apparent upon a detailed study of the accompanying drawings and specification, together with the appended claims.

In the drawings, which show an illustrative embodiment of the invention,

Fig. 3 is a cross section along the line 3—3 of Fig. 1;

Fig. 4 is a cross section along the line 4—4 of Fig. 1;

Fig. 5 is a partial front elevation of the toaster;

Fig. 6 is a detailed view showing a cross section through the structure immediately associated with the controlling temperature responsive device;

Fig. 7 is a fragmentary view similar to Fig. 6 showing the thermo-bar when heated;

Fig. 8 is a cross section along the line 8—8 of Fig. 6;

Figs. 14 and 15 are side elevations showing the main switch of the toaster;

Fig. 16 is a detailed view showing the relay and associated mechanism for tripping the latch mechanism;

Fig. 17 is a detailed view showing the pivoted catch used for tripping the latch mechanism;

Figure 1:
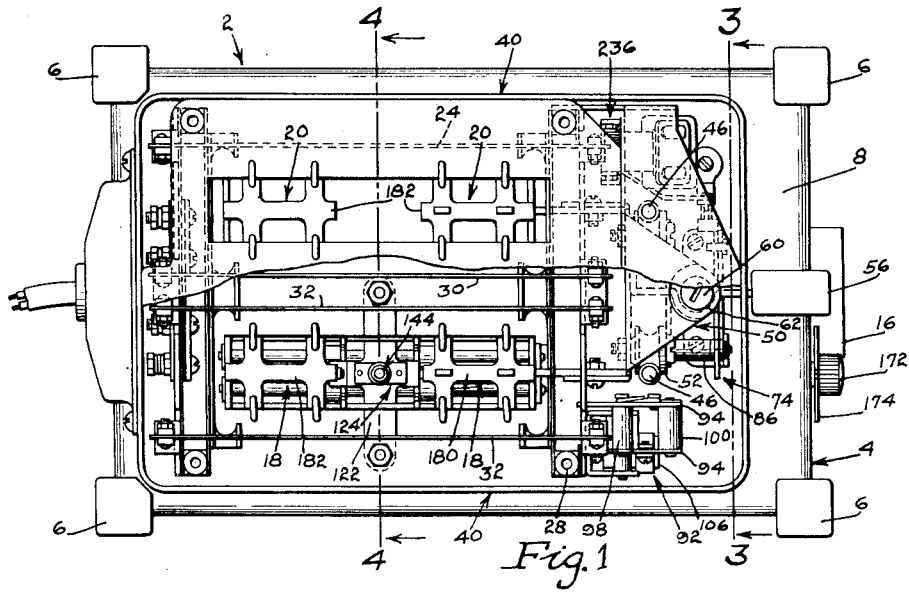
Fig. 1 is a plan view of the toaster.

Referring to the drawings, numeral 2 represents generally an automatic bread toaster having a lower supporting casing 4 which is fixed to and supported by suitable legs 6. The casing 4 is made of sheet metal or the like and comprises a top portion 8 having sides 10 bent downwardly at right angles therefrom. Secured to the underside of the top portion 8 and extending longitudinally thereof are a pair of angle members 12 between which is fitted a sliding drawer 14 provided with a handle 16. The drawer 14 serves to collect crumbs which may fall from the oven above.

Figure 2:
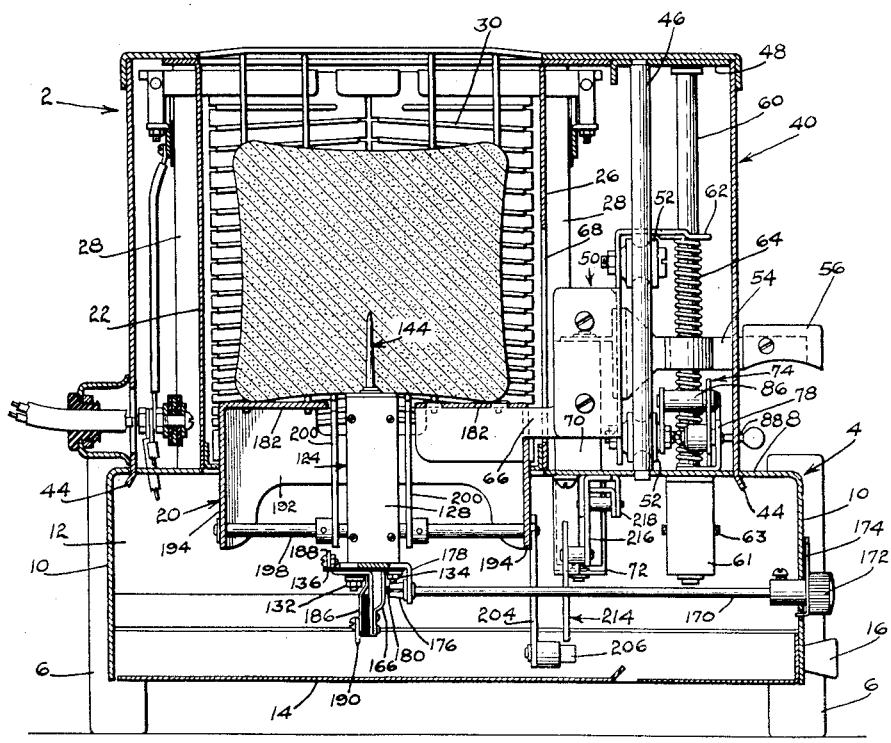
Fig. 2 is a longitudinal sectional view through one of the ovens of the toaster showing a slice of bread fully inserted for toasting.

The top 8 of the casing 4 is provided with a pair of openings each of which is sufficiently large to admit the bread carriers 18 and 20 as illustrated in Figs. 2 and 4. Mounted on top 8 above these openings, which are side by side, there is a casing formed of a rear wall 22, side walls 24 and a front wall 26. These walls 22, 24 and 26 are preferably formed of sheet metal and are secured to upright posts 28 which are bolted at their lower ends to the top 8 of the casing 4. Within the casing formed by these walls 22, 24 and 26 there are arranged a plurality of heating elements 30 and 32 which may be formed of mica having electrical resistance elements affixed thereto. The heating elements 30 form together with the walls 22 and 26, a chamber for the reception of a bread slice to be toasted. The heating elements 32 form a similar chamber together with the walls 22 and 26.

At the top of the casing formed by the walls 22, 24 and 26 there is placed a cover member 34 having openings 36 and 38 permitting the insertion and removal of bread slices into the chambers formed by the heating elements 30 and 32. An outer casing 40 having a top 42 completely conceals the casing formed by walls 22, 24 and 26 and is secured to the top 8 of casing 4 by means of integral bent lugs 44 inserted into openings in the top 8 as shown.

Within the casing 40 and in front of the toasting ovens above described there are a pair of upright posts 46 which are mounted between the top 8 of the casing 4 and a bracket member 48 which is bolted at its sides to the front post 28 as illustrated in Fig. 3. A carriage generally designated at 50 is mounted between the two posts 46 and is provided with wheels 52 having concave surfaces as indicated in Fig. 2 to fit the posts 46. This carriage is provided with a rigidly secured operating handle 54 extending to the outside of casing 40 through a slot 58 and having a grip member 56 secured thereto. A third post 60 extends through an opening in the top 8 and is mounted between a lower bracket member 61 as shown in Fig. 3 and the upper bracket member 48 on a line intermediate of posts 46 but somewhat forwardly thereof. An arm 62 which is preferably formed integrally with the carriage 50 has an opening formed therein to permit sliding movement thereof with respect to post 60. A compression spring 64 is wound about the post 60 and disposed between the said arm 62 and the top of an adjustable nut 63 which is screw-threaded at the lower end of post 60. This spring 64 tends to normally hold the carriage 50 in raised position adjacent the bottom of bracket member 48 but by depressing handle 54, the carriage may be moved down into the position shown in Figs. 2 and 3 against the action of spring 64.

A latching mechanism is provided for holding the carriage in lowermost position as shown in Figs. 2 and 3. This mechanism comprises a catch member generally designated at 74 which is provided with a hooked end 76 and is pivoted to an upright support 78 as at 80. A spring 82 which is secured at one end to the support 78 and at its other end to the catch member 74 tends to resiliently hold this member in the position shown in Fig. 3. The end of member 74 opposite the hook shaped end 76 is provided with a bent projection 84 as shown in Fig. 16. An arm 86 is fixed to the carriage 50 and extends outwardly therefrom to co-operate with the hook 76.

As the carriage 50 is lowered it first engages the upper curved surface of hook 76 and rotates the same in counter clockwise direction about the pivot 80 until just before the carriage reaches the position shown in Fig. 3, whereupon the spring 82 rotates the catch member 74 into position to hold the carriage 50 against the compression of spring 64 as illustrated in Fig. 3. In order to enable manual release of the carriage 50 there is fixed to the catch member 74 a stud 88 which extends outside of the casing 40 through the slot 90. If the stud 88 is raised from the positions shown in Figs. 3 and 5, it will be evident that catch member 74 will be rotated in counter clockwise direction whereupon arm 86 will be released and the carriage 50 will be pushed upwardly under the compression of spring 64.

The bread carriers 18 and 20 are fixed on arms 66 secured to the carriage 50 and extending through the slots 68 which are formed in the wall 26. There is also fixed to the carriage 50 a cylinder 70 which co-operates with the piston mounted on a rod supported by the bracket 72 to reduce the shock which would otherwise result from sudden release of the carriage when in the position shown in Fig. 3. Upon movement of the carriage 50, it will be apparent that the bread carriers 18 and 20 will move up and down within the oven of the toaster, a proportionate amount.

A main switch generally designated at 92 controls the electrical circuit for the heating elements 30 and 32 and is arranged to operate automatically upon the raising and lowering of the carriage 50. The switch is shown in detail in Figs. 14 and 15 and by reference to these figures, together with Fig. 3, it will be seen that the movable switch element comprises a substantially rigid frame having a pair of arms 94 and 96 which are connected by means of cross bars 98 and 100. The arm 94 is pivoted to a support 102 as at 104, the support 102 being screwed to the post 28. A movable contact 106 is carried at the end of arm 94 and is adapted to engage the stationary contact 108 which is fixed to the post 28. Arm 96 has a cam groove 110 in which is adapted to operate a roller 112 which is mounted on an arm fixed to the carriage 50. When the carriage is in completely raised position, the parts will assume the relative positions shown in Fig. 14 but as the carriage 50 is depressed, the roller 112 will move downwardly along a vertical line thereby to cause the movable switch element 92 to rotate about its pivot 104 and cause contacts 106 and 108 to engage as illustrated in Fig. 15. Upon upward movement of the carriage 50, the operation is of course reversed and the contacts are quickly separated.

A pair of posts 120 are bolted to the underside of top 8 of the casing 4 and extend downwardly as shown in Fig. 4. A supporting plate 122 made of rigid sheet metal or the like is bolted across the lower ends of the posts 120 to form a support for a casing generally designated at 124. As shown in Figs. 6 to 8, this casing 124 is formed of end walls 126 preferably made of relatively thick metal to which are screwed side walls 128 which may be made of sheet metal, and a top 130 also of sheet metal. The walls 126 are provided with integrally formed bolts at their lower ends which are adapted to pass through openings provided in the supporting plate 122 and be secured by means of nuts 132 and 134. Between the bottom of the support 122 and the nuts 132—134 there is arranged a layer of insulating material 136. The nut 132 serves to secure a rigid L-shaped conductor 138 which is provided with an opening through which the bolt formed on the end of one of the walls 126 extends. This conductor is fully insulated by means of the insulating layer 136, the insulating ring 140 and an insulating washer 142.

At the top of the casing 124 there is arranged an elongated housing 144 which is preferably circular in cross section and pointed at its upper end as at 146, and is secured at its lower end to the top 130. This housing 144 is elongated and pointed as shown so as to be capable of readily piercing a bread slice which is to be toasted, and is preferably formed of metal capable of readily conducting heat and electricity. The housing 144 is mounted on the top 130 in any convenient manner such as by means of an integral collar 148 co-acting with the flanged edge 150 and is completely insulated from the casing 124 by means of the insulating washer 152 which is U-shaped in cross section.

Secured at the pointed end 146 in any convenient manner as for example by frictional contact in a narrow bore, and extending downwardly within the housing 144, is a thermo-bar generally designated at 154. This thermo-bar may be made of the well known bimetal which is adapted to warp when subjected to heat and has an upper portion 156 which warps in one direction when heated, and a lower portion 158 which warps in the opposite direction when heated as illustrated in Fig. 7. Preferably, the thermo-bar 154 is made of a single strip of bimetal and is twisted through 180° to provide the upper and lower portions 156 and 158 as shown at 160. If desired, however, the thermo-bar may be made of two separate strips of bimetal joined together in any convenient manner as by soldering or welding, and so arranged that one strip will warp in one direction when heated and the other strip will warp in the opposite direction when heated.

At the lower end of thermo-bar 154 there is carried a contact 162 which is adapted to co-act with a contact 164 mounted on a strip of resilient metal 166 which is secured at its lower end to the rigid conductor 138 by means of rivets 168. When the housing 144 and the thermo-bar 154 therein become heated, the thermostat will assume a shape as illustrated in Fig. 7 and cause contacts 162 and 164 to engage. As the thermo-bar cools, contacts 162 and 164 are separated.

Means are provided for adjusting the position of contact 164 within the casing 124. These means comprise a rod 170 which passes through the outer casing 4 of the toaster and is provided with a knob 172 and an indicator 174, both positioned outside of the casing 4. A member 176 which is secured to a depending lug 178 of the support 122 is provided with a threaded passageway into which a threaded end of a rod 170 is adapted to fit. At the outer tip of this threaded end of rod 170 there is provided a tip 180 of insulated material which bears against the resilient metal member 166 carrying the contact 164. Normally, the member 166 tends to move to the right of the position shown in Fig. 6 and upon rotation of the rod 170 by means of the knob 172, the position of insulating tip 180 will be changed and the position of contact 164 within the casing 124 will correspondingly be changed.

An insulating block 184 is secured to the rigid conductor 138 and constitutes a support for a terminal of the conductor 186 which passes through openings provided in the conductor 138, the insulating layer 136, and the support 122 to extend into the casing and make contact with the housing 144. The resilient metal member 166 is also a conductor of electricity and passes through openings provided in the support 122 and the insulating layer 136 to enter the casing 124. When the contacts 162 and 164 are in engagement, a portion of a control circuit hereinafter to be described will be closed through the lead 188, rigid conductor 138, element 166, contact 164, contact 162, thermo-bar 154, housing 144, and conductor 186, to lead 190. This circuit is completely insulated from the casing 124 and from the support 122.

The metallic bread carrier is formed of one piece and comprises an upper platform 182 upon which a bread slice to be toasted is adapted to be carried, depending side walls 192, and depending end walls 194. As shown in Figs. 1, 2, and 4, the housing 144 and the upper portion of casing 124 are adapted to extend through an opening formed in the platform 182 when the carrier is in lowermost position. Journalled between the end walls 194 and extending longitudinally of the bread carrier there are a pair of shafts 196 and 198 which are separated a sufficient amount to permit passage of the housing 144 and casing 124 therebetween, upon movement of the carrier into lowermost position. Two pairs of co-acting jaws 200 each having an upper, serrated bread gripping surface 202 extending through the said opening in platform 182 are fixed on these shafts, one jaw of each pair being fixed on one shaft and the other jaws being fixed on the other shaft at adjacent points. The pairs of jaws are arranged on either side of casing 124 and housing 144 as will be evident from Fig. 2.

Figure 9:
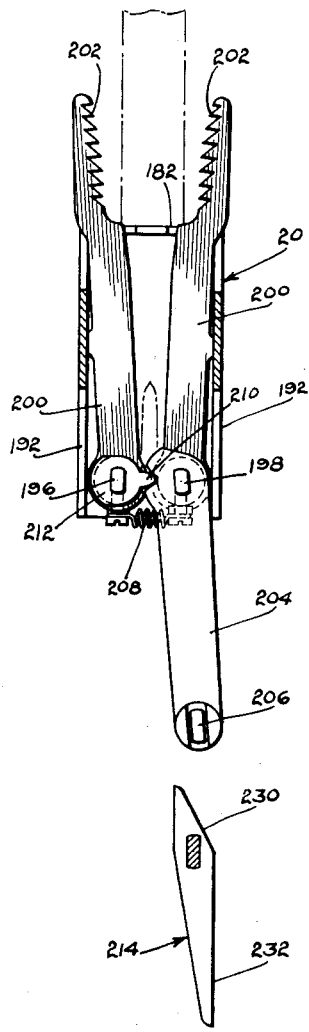
Figs. 9, 10 and 11 are detailed views illustrating the operation of the bread gripping means.

A downwardly extending arm 204 is fixed on the shaft 198 and is provided at its lower end with a stud 206 extending at right angles therefrom. Its upper end adjacent the shaft 198 has a detent formed therein which is engaged by a tooth 210 of a member 212 fixed on the shaft 196. Consequently shafts 196 and 198 rotate simultaneously in opposed direction to expand or contract the pairs of jaws 200. A spring 208 normally holds the jaws in full expanded position against the side walls 192 of the bread carrier 20 as shown in Fig. 9.

Figure 10:
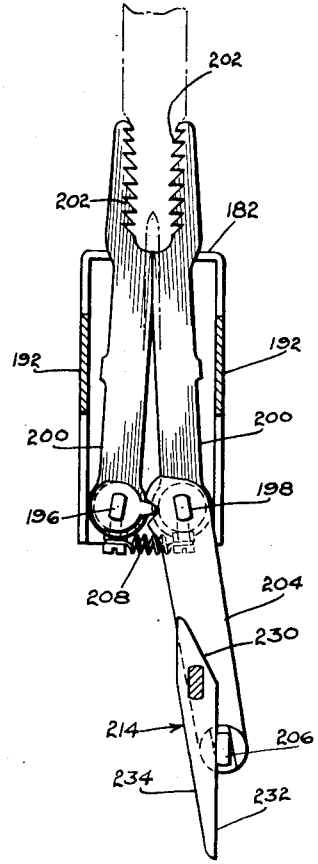
Figure 11:
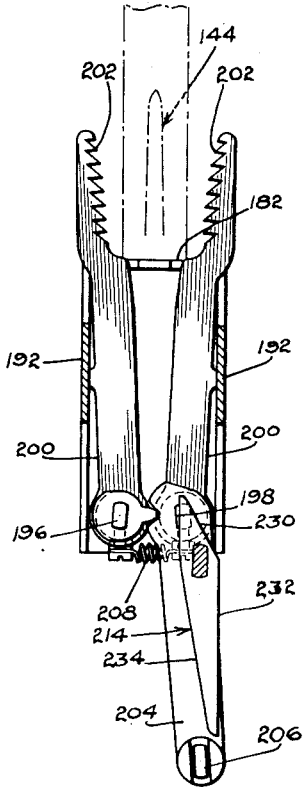
Figure 12:
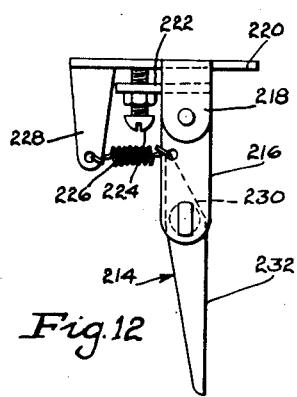
Figs. 12 and 13 are detailed views of the cam member for operating the gripping means.
Figure 13:
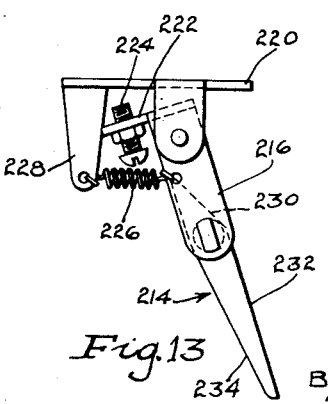

A cam member generally designated at 214 is fixed to a member 216 which is pivoted to a depending lug 218 of a plate 220 secured to the underside of the top 8 of housing 4. The member 216 has an integrally formed projection 222 which is provided with a threaded opening receiving the set screw 224. Member 216 cannot rotate in a clockwise direction beyond the position shown in Fig. 12 but is capable of rotation in counter-clockwise direction as shown in Fig. 13. A spring 226 which is attached at one end to the member 216 and at its other end to a lug 228 fixed with respect to member 220, serves to normally hold the member 216 in the position shown in Fig. 12. Fig. 9 shows the position of the parts when the carrier is in uppermost position. Upon depression of the handle 54 secured to the carriage 50, the bread carrier 20 will be moved downwardly and as a result the stud 206 on the arm 204 will first engage the cam surface 230 of the cam member 214 to rotate shaft 198 in counter-clockwise direction and contract jaws 200. Upon continued down movement of the bread carrier the stud 206 will engage the cam surface 232 of the cam member 214, the shafts 196 and 198 being held stationary with the jaws contracted as shown in Fig. 10. Just prior to the reaching of the lowermost position of the bread carrier, stud 206 passes the lowermost tip of cam surface 232 and arm 204 is pulled to the left by means of the spring 208 with the result that the jaws open as shown in Fig. 11. When the parts are in the position shown in Fig. 11 the bread carrier is occupying its lowermost position in the oven.

The purpose of the bread gripping jaws is to guide the bread slice and to insure that it will be properly pierced by the housing 144. As shown in Fig. 10 the jaws are gripping the bread when it reaches the pointed end 146 of the housing 144 and they continue to grip the bread until the housing 144 is completely inserted as shown in the dot and dash lines in Fig. 11. It will be noted that the housing 144 is positioned at the intersection of the longitudinal and transverse center lines of the pairs of co-acting jaws to insure the proper insertion thereof into the bread slices.

When the bread carrier is again moved into uppermost position, the stud 206 slides along the surface 234 of the cam member 214. This will have no effect on the jaws inasmuch as the member 216 is free to rotate in counter-clockwise direction. The jaws will therefore be fully expanded while the bread carrier is at lowermost position and during movement of the bread carrier from lowermost to uppermost position.

The contacts 162 and 164 which are located in the casing 124, control the circuit of a relay generally designated at 236 and shown more particularly in Fig. 16. The relay shown comprises a field 238 having a coil winding 240 and is provided with a pivoted armature 242 having fixed thereto an arm 244. A link 246 is pivoted at the outer end of arm 244 and is arranged to slide in a slot provided in the raised member 248 which is secured to the top 8 of casing 4. If desired, the link 246 may also extend through a slot provided in the top 8. Pivoted to the link 246 near its lower end is a trip member 250 whose limits of rotation are shown by the full and dotted lines in Fig. 17. Upon downward movement of the link 246 the trip member 250 is adapted to pass the projection 84 on the catch member 74, the trip 250 pivoting back into the dotted line position shown in Fig. 17 during the passage. Upon passing the projection 84, the trip 250 will fall back into the full line position. When the link 246 is raised, the trip member 250 will therefore engage the projection 84 to raise the catch member 74 and rotate it in counter-clockwise direction. The weight of the arm 244, link 246, and catch 250 serves to hold the armature 242 in the full line position shown in Fig. 16 when no current is passing through the relay 236. When current is passed through the relay, however, the armature 242 will align itself with the field and assume the position shown in dot and dash lines in Fig. 16, thereby raising arm 244, link 246, and catch 250.

Figure 18:
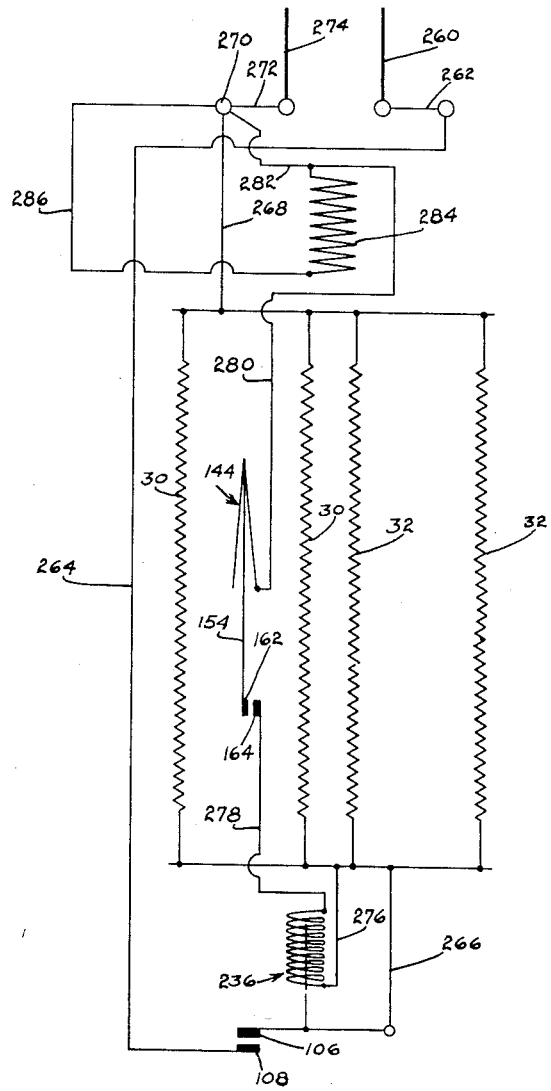
Fig. 18 is a diagram showing the control circuit.

Fig. 18 is a diagrammatic showing of the circuit controlled by the contacts 162 and 164. Referring more particularly to Fig. 18, numerals 30—32 designate generally the heating elements of the toaster, numeral 236 designates the relay for operating the main switch controlling the heating elements, and numeral 144 designates the housing for the thermo-bar 154, these reference numerals being the same as those used in the previous description. When the main switch of the toaster is closed and a new slice of bread has been inserted into the oven, contacts 106 and 108 will be closed, and contacts 162 and 164 will be separated. Current then flows through the following circuit: side of line 260, wire 262, wire 264, contact 108, contact 106, wire 266, heating elements 30—32, wire 268, binding post 270, wire 272, and side of line 274.

As the current flows through the heating elements 30, the slice of bread in the oven becomes heated, thermo-bar 154 becomes heated, and contact 162 moves into engagement with contact 164. When these contacts close, a part of the current flowing in the circuit described above will branch off and flow through wire 276, the field winding of relay 236, wire 278, contact 164, contact 162, thermo-bar 154, housing 144, wire 280, wire 282, and binding post 270. The wire 282 is connected as shown when the toaster is being operated by means of alternating current and is disconnected from binding post 270 when operating with direct current in order to protect the contacts 162 and 164 against an unduly high load. This wire 282, it will be observed, short-circuits the resistance 284 when connected for alternating current. When the toaster is operated on direct current, and wire 282 is disconnected from binding post 270, the current must flow from wire 280 through resistance 284 and wire 286 in order to get to the binding post 270. When current flows through the field winding of the relay 236 the armature of the relay will move to separate contacts 106 and 108, thereby breaking the circuit for both the relay 236 and the heating elements 30—32.

Figure 19:
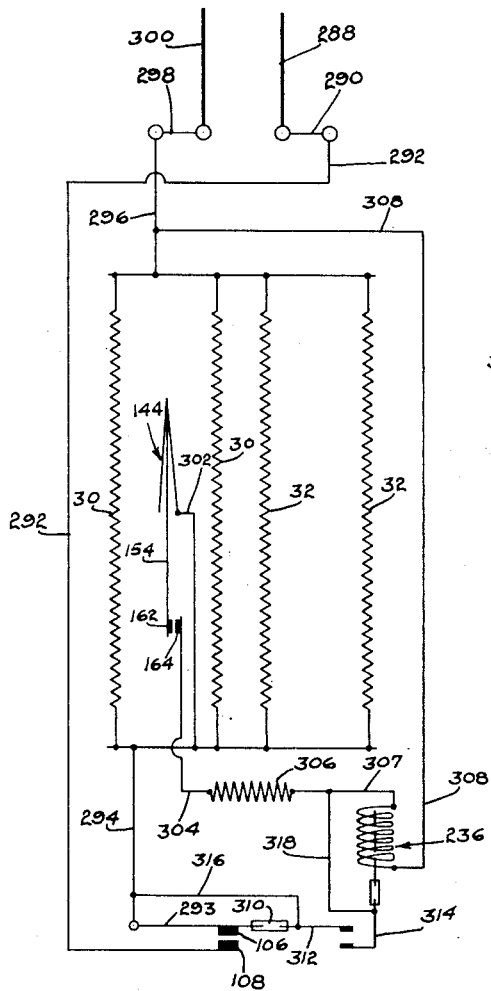
Figs. 19 and 20 are diagrams showing the modifications of the control circuit shown in Fig. 18.
Figure 20:
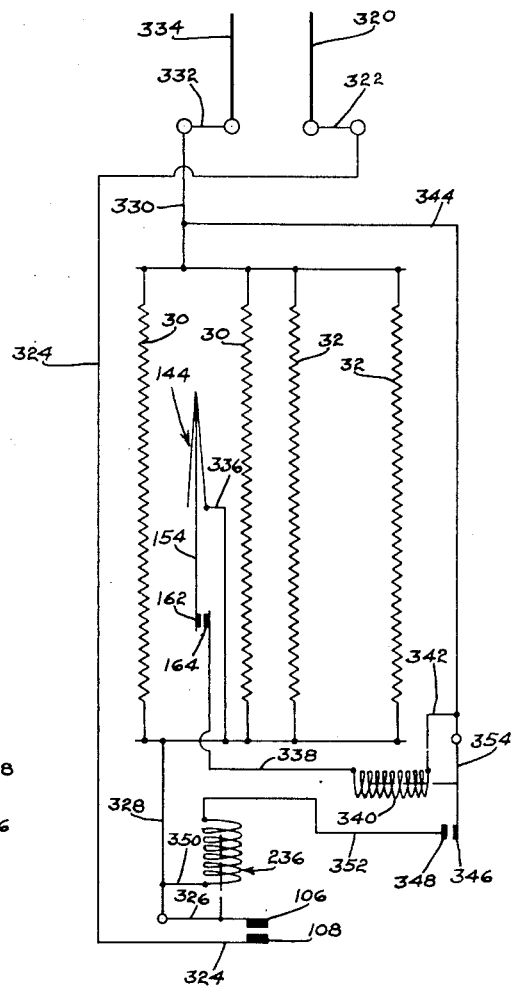

Figs. 19 and 20 disclose modified forms of control circuits. Referring more particularly to Fig. 19 current flows through the following circuit when the contacts 162 and 164 are separated and the contacts 106 and 108 are in engagement: side of line 288, wire 290, wire 292, contact 108, contact 106, switch arm 293, wire 294, heating elements 30—32, wire 296, wire 298 and the other side of the line 300. As current flows through the heating coils 30—32 they will radiate heat and raise the temperature of the bread in which the housing 144 is inserted whereupon thermo-bar 154 will act to move contact 162 into engagement with contact 164. When these contacts engage part of the current flowing to the heating coils, as described above, will branch off and flow through wire 302, housing 144, thermo-bar 154, contact 162, contact 164, wire 304, resistance 306, wire 307, field winding of relay 236, and wire 308. When current flows through the winding of relay 236 it will move its armature to raise the movable member of the switch carrying contact 106 which constitutes a rigid conducting portion 293, an insulated portion 310 and a rigid conducting portion 312. Fixed to the armature of relay 236 and insulated therefrom is a rigid conducting member 314 which engages the member 312 to separate the contacts 106 and 108 upon energization of the relay 236. Member 314 and its contact may comprise link 246 and the pivoted catch member 250.

When current first begins to flow through the relay 236, its armature will be moved until members 312 and 314 come into engagement and when these members contact, current will flow through the winding of relay 236 through wire 316, member 312, member 314, wire 318, and wire 307. Consequently, resistance 306 and the contacts 162 and 164 will be short-circuited when the members 312 and 314 come into engagement. The short-circuiting of resistance 306 results in the flow of a greater amount of current through relay 236 with the result that the contacts 106 and 108 are quickly separated by the armature, thereby breaking all of the circuits. In this arrangement no heavy load of current flows through the contacts 162 and 164 due to the provision of resistance 306, but the relay 236 receives sufficient current to positively separate the contacts 106 and 108 upon engagement of members 312 and 314.

Referring now to Fig. 20, when contacts 106 and 108 are closed, and contacts 162 and 164 are open, current will flow through the following circuit: side of line 320, wire 322, wire 324, contact 108, contact 106, switch arm 326, wire 328, heating elements 30—32, wire 330, wire 332, and side of line 334. When the thermo-bar 154 becomes sufficiently heated to move contact 162 into engagement with contact 164 current will flow through wire 336, housing 144, thermo-bar 154, contact 162, contact 164, wire 338, relay winding 340 which is of relatively high resistance, wire 342, and wire 344 to wire 330. Upon energization of the relay 340 its armature will move to close the contacts 346 and 348 whereupon current will flow through the winding of relay 236 through wire 350, winding of relay 236, wire 352, contact 348, contact 346, switch arm 354, and wire 334 to wire 320.

The winding of relay 236 is of lower resistance than that of relay 340. Due to the high resistance of relay 340, very little load will be carried by the contacts 162 and 164 and upon the closing of contacts 346 and 348 sufficient current will flow through the relay 236 to quickly and positively separate the contacts 106 and 108. None of the load required to separate these contacts 106 and 108 is carried by the contacts 162 and 164.

In the operation of the toaster a bread slice to be toasted is placed on the platform 182 of the carrier 20 which co-operates with the housing 144 of the thermo-bar, while the bread carrier is in uppermost position. At this point the carriage 50 is also in uppermost position and the bread carrier and the carriage are being retained in such position by means of the spring 64. Also, the bread gripping jaws are expanded as illustrated in Fig. 9 and the contacts 106 and 108 of the main switch are separated as illustrated in Fig. 14.

The operator simply presses down the handle 54 which is secured to the carriage 50. Upon downward movement of this handle, the carriage will also be moved downwardly to move the bread carriers down and the bread gripping jaws will contract to grip the bread slice on carrier 20 as illustrated in Fig. 10. During further movement to lowermost position the housing 144 will become completely embedded in the bread slice and the bread gripping jaws will move into expanded position as shown in Fig. 11. The contacts 106 and 108 are further closed when the bread carriers reach lowermost position. The carriage 50 will be held in lowermost position by means of the catch member 74, the various parts being in the positions illustrated in Figs. 1, 2, 3, 4, 5, 6, 11, 15 and 16.

Due to the closure of the contacts 106 and 108, current will flow through the heating elements 30—32 whereupon the toasting operation will begin. As the bread becomes toasted, its interior temperature will rise, and the thermo-bar will move under the influence of this rise in temperature to close the contacts 162 and 164. Upon closure of these contacts the relay 236 will be energized whereupon the link 246 will be raised and the catch member 74 will be moved to release the carriage 50. Immediately upon release the carriage 50 will be raised into uppermost position by means of the spring 64 whereupon the bread carriers 18 and 20 will also be raised into uppermost position and the contacts 106 and 108 will be separated to cut off the flow of current to the heating elements 30 and 32.

With each succeeding slice to be toasted, the same operation is repeated. In each case it is only necessary for the operator to drop a bread slice into the opening provided in the oven and to depress the arm 54. The operation is purely automatic and uniform toast will be obtained irrespective of the temperature of the oven at the beginning of each toasting operation.

The compensating means employed in the thermal responsive device prevent any error in the timing of each individual toasting operation after the oven and thermo-bar have become heated. Assuming the entire device to be at room temperature when the first slice is toasted, there will be little or no warping of the lower portion 158 during the toasting of the first slice, it being understood that lower portion 158 tends to move contact 162 away from contact 164 whereas the upper portion 154 tends to cause the contacts to engage. When the second slice is inserted into the oven, however, the thermo-bar 154 and the housing 144 themselves have a temperature above that of the room temperature. Consequently, the thermostat will follow the temperature of the bread as it becomes heated, more closely than it did during the toasting of the first slice. Also, the housing 144 itself imparts some heat to the interior of the second bread slice so that the portion of the bread immediately surrounding housing 144 may heat up more quickly than the remainder of the bread. However, at this stage the portion 158 of the thermostat has become somewhat heated and it will therefore warp in a direction opposite to that of the upper half 156 thereby to compensate for the differences in timing which may result from variations in the temperature of the housing 144 and thermo-bar 154 at the beginnings of the individual toasting operations. The relative lengths of portions 156 and 158 of thermo-bar 154 are such as to result in the proper compensation and of course vary in toasters of varying size and construction.

While I have shown one form of compensating means, I do not intend to limit myself to these specific means. Any desired means may be employed. For example, in place of a single thermo-bar which is twisted through 180° one may employ two thermo-bars which are joined together at one of their ends in any convenient manner as by welding or soldering, as explained above. So also one may secure a single thermo-bar to housing 144 which warps uniformly throughout its length in one direction, and mount the contact 164 on a compensating thermo-bar which tends to move contact 164 in a direction away from the contact 162 as the oven becomes heated. Further, any desired thermal responsive means may be used, as for instance, fluid pressure means or electrical resistance means.

Upon the toasting of a relatively large number of slices of bread, for instance, four or five, in rapid succession, it may happen that the thermo-bar will become so hot that it will not act to separate the contacts 162 and 164 for several seconds after the insertion of a fresh bread slice to be toasted, but this does not interfere with the automatic operation of the device. Under such circumstances the contacts 162 and 164 will remain closed after the operator has moved down the carriage and caused it to be held in lowermost position by the catch member 74. The relay 236 will be energized and the link 246 and the pivoted catch 250 will be in raised position. Within a few seconds the fresh bread slice will have absorbed so much heat from the thermo-bar that contacts 162 and 164 will separate whereupon relay 236 will become de-energized, and the link 246 and pivoted catch 250 will drop. The catch 250 readily passes the projection 84 because of its pivotal mounting and when it drops below the projection 84 it moves back into position to engage the projection upon upward movement, due to its own weight. When the bread slice is completely toasted, the thermo-bar will again move contacts 162 and 164 into engagement whereupon relay 236 will be energized and the link 246 will move upwardly to rotate catch member 74 and release the carriage 50.

The operator may selectively cause the toaster to produce lighter or darker toast by adjustment of knob 172. Rotation of rod 170 changes the distance between contacts 162 and 164 as previously explained, and therefore causes a change in the timing of the toasting operation. An increase of the distance between these contacts causes the toaster to produce darker toast and the converse is true when the distance is shortened. Similar means for adjusting the distance between contacts 162 and 164 may be used if contact 164 is mounted upon a compensating thermo-bar.

While no conventional type of indicating means such as a bell or buzzer has been shown it is of course understood that such indicating means may be employed. Also, the movement of the bread carriers and the control of the heating elements serve as an indication to the operator that the toasting operation is completed.

In the embodiment of the invention herein shown and described, insertion of the housing 144 into the bread slice is effected as a result of movement of the bread slice with respect to the housing 144, the housing being stationary. However, it is of course understood that insertion may, if desired, be effected by movement of the housing with respect to the bread, or upon relative movement of both the housing and the bread slice.

In my co-pending application Serial Number 504,777, filed December 26, 1930, I have described an automatic toaster wherein the timing of the toasting operation is effected by means insertable or receivable in the bread slice being toasted. The means therein shown comprise an electrical control circuit having a pair of needle-like electrodes which are inserted into the bread slice being toasted. At the beginning of the toasting operation the bread between the electrodes is comparatively moist and forms a relatively good conductor but as the toasting operation continues and current flows across the electrodes, there is a drying effect and the resistance across the electrodes increases. This increase in resistance results in a decrease in the current flowing through the control circuit and this current change is utilized to control the toasting operation. In the toaster shown in my co-pending application the control is operative in response to a variation of the moisture content and/or moisture distribution in the bread whereas in a toaster made in accordance with the present invention the control operates in response to variation in temperature at the inside of the bread slice.

I claim as my invention:

1. In a bread toaster provided with a heating element, means responsive to the temperature of the inside of a slice of bread being toasted, and means operated thereby for terminating the toasting of the bread slice.

2. In a bread toaster provided with an electrical heating element, means responsive to the temperature of the inside of a slice of bread being toasted, and means operated thereby for terminating the toasting of the bread slice, said means being arranged to pierce a slice of bread being toasted.

3. In a bread toaster provided with heating means, and means for supporting a bread slice adjacent said heating means, means responsive to the temperature of the inside of a slice of bread being toasted for controlling the operation of said heating means, and means for inserting said control means into a slice of bread being toasted.

4. In a bread toaster having a space therein adapted to be occupied by a slice of bread being toasted, and a heating element, means responsive to the temperature of the inside of said slice for controlling said heating element, said means having a portion thereof adapted to lie in said space, and means for inserting the aforesaid portion of the control means into said slice of bread being toasted.

5. In a bread toaster having a space therein adapted to be occupied by a slice of bread being toasted, means operative in response to the temperature of the inside of said slice for indicating the completion of the toasting operation, said means having a portion thereof adapted to lie in said space, and means for inserting the aforesaid portion of the indicating means into said slice of bread being toasted.

6. In a bread toaster provided with an oven having a space adapted to be occupied by a slice of bread being toasted, means operative in response to the temperature of the inside of said slice and having a portion thereof adapted to lie in said oven space for indicating the completion of the toasting operation, and means for inserting said slice into said oven space and causing the same to become pierced by the aforesaid portion of the control means upon such insertion.

7. A bread toaster having in combination, heating means, means for supporting a bread slice adjacent said heating means, means operative in response to the temperature of the inside of a bread slice being toasted for controlling the toasting action of said heating means on the bread slice, and means including members gripping a slice of bread to be toasted for inserting said control means therein.

8. In a bread toaster provided with an oven having a space therein adapted to be occupied by a slice of bread being toasted, means for ejecting the bread from the oven when toasted, means operative in response to the temperature of the inside of said slice for controlling said bread ejection means, and means including members gripping a slice of bread to be toasted for inserting the same into the aforesaid oven space and for causing it to be pierced by the aforesaid control means.

9. In a bread toaster provided with an oven having a space therein adapted to be occupied by a slice of bread being toasted, an electrical resistance heater, means operative in response to the temperature of the inside of said slice for controlling the flow of electricity to said heater, and means including members gripping a slice of bread to be toasted for inserting the same into the aforesaid oven space and for inserting said control means therein.

10. A bread toaster having in combination, heating means, means for supporting a bread slice adjacent said heating means, a thermally responsive device receivable within a bread slice, means for inserting said thermally responsive device into a bread slice to be toasted, and means controlled by said thermally responsive device for controlling the toasting action of said heating means on the bread slice.

11. In a bread toaster provided with an oven having a space adapted to be occupied by a slice of bread being toasted, heating means for the oven, a thermally responsive device extending into said space, means including members adapted to grip a slice of bread to be toasted for inserting said thermally responsive device therein, and means controlled by the thermally responsive device for controlling the operation of said heating means.

12. In a bread toaster provided with an oven having a space adapted to be occupied by a slice of bread being toasted, and an electrically operated heating element, a thermally responsive device receivable in a bread slice to be toasted, means including members adapted to grip a slice of bread to be toasted for inserting said thermally responsive device therein, and means associated with the thermally responsive device for controlling the flow of electricity to said heating element.

13. In a bread toaster provided with an oven having a space adapted to be occupied by a slice of bread being toasted, and means for ejecting the bread, a thermally responsive device receivable in a bread slice to be toasted, means including members adapted to grip a bread slice to be toasted for inserting said thermally responsive device therein, and means associated with the thermally responsive device for controlling said bread ejection means.

14. In a bread toaster provided with an oven having a space adapted to be occupied by a slice of bread being toasted, an electrically operated heating element, and means for ejecting slices of bread from the oven, a thermally responsive device, means including members adapted to grip said slice of bread for inserting said thermally responsive device therein, and means associated with said thermally responsive device for controlling the flow of electricity to said heating element and for controlling the operation of said bread ejecting means.

15. In a bread toaster provided with an oven, heating means, and a bread carrier movable to admit and eject slices of bread, a thermally responsive device receivable in a bread slice to be toasted and positioned in the path of a slice of bread on said carrier, means including members adapted to grip a bread slice during movement of the carrier into the oven for inserting said thermally responsive device into the slice, and means associated with said thermally responsive device for controlling the toasting action of said heating means on the bread.

16. In a bread toaster provided with an oven, a heating element, and a bread carrier movable in the oven to admit and eject slices of bread, a pointed thermally responsive device in the path of a slice of bread on said carrier, means including members adapted to grip said slice during movement of the carrier in a direction to admit the same into the oven for causing the slice to be pierced by said thermally responsive device, and means associated with said thermally responsive device for controlling the movement of the bread carrier in a direction to eject the bread.

17. In a bread toaster provided with an oven, an electrically operated heating element, and a bread carrier movable in the oven to admit and eject slices of bread and having an opening therein, an elongated thermally responsive device having a pointed end disposed in the path of a slice of bread on said carrier and adapted to extend through said opening in the carrier when the same is in the position occupied after having admitted a slice of bread into the oven, means including members adapted to grip a bread slice during movement of the carrier in a direction to admit the same into the oven for inserting said thermally responsive device into the slice, and means associated with said thermally responsive device for controlling the movement of the bread carrier in a direction to eject the bread from the oven and for controlling the flow of electricity to said heating element.

18. In a bread toaster provided with an oven, an electrically operated heating element, a bread carrier movable in the oven to admit and eject slices of bread, means for normally holding said carrier in position to receive a bread slice to be toasted, and a latching mechanism for holding said carrier in position occupied when the bread is completely within the oven, a thermally responsive device disposed in the path of a slice of bread on said carrier and shaped to pierce such slice, means including members adapted to grip said slice during movement of the carrier in a direction to admit bread into the oven for causing the slice to be pierced by said thermally responsive device, and means associated with said thermally responsive device for releasing said latching mechanism and for controlling the flow of electricity to said heating element.

19. A bread toaster having in combination, heating means, means for supporting a bread slice adjacent said heating means, a housing shaped to pierce a bread slice to be toasted and be received therein, a thermo-bar in said housing, and means associated with said thermo-bar for controlling the toasting operation of said heating means.

20. In an automatic bread toaster provided with an oven having an opening for the admission and removal of slices of bread, and means for inserting and ejecting slices of bread, a housing shaped to be receivable in a bread slice and so positioned in said oven as to pierce and become embedded in a slice of bread inserted into the oven to be toasted, a thermo-bar in said housing, and means associated with said thermo-bar for controlling said ejecting means.

21. In an automatic bread toaster provided with an oven having an opening for the admission and removal of slices of bread, and an electrically operated heating element, an elongated pointed housing so positioned in said oven as to pierce and become embedded in a slice of bread inserted into the oven to be toasted, a thermo-bar in said housing, and means associated with said thermo-bar for controlling the flow of electricity to said heating element.

22. In an automatic bread toaster provided with an oven having an opening for the admission and removal of slices of bread, means for inserting and ejecting slices of bread, and an electrically operated heating element, an elongated pointed housing receivable in a bread slice, means for inserting said housing into a slice of bread inserted into the oven to be toasted, a thermo-bar in said housing, and electrically operated means associated with said thermo-bar for controlling the flow of electricity to said heating element and for controlling said ejection means.

23. In an automatic bread toaster provided with an oven having a space adapted to be occupied by a slice of bread being toasted, and an electrical heating element, a housing provided with a pointed end arranged in said oven to pierce and become embedded in a slice of bread inserted into the oven to be toasted, a thermo-bar in said housing, means associated with said thermo-bar for controlling the flow of electricity to said heating element, and means associated with the thermo-bar for ejecting the slice of bread from the oven.

24. In an automatic bread toaster provided with an oven having an opening for the admission and removal of slices of bread, an electrical resistance heating element, and a bread carrier movable in the oven toward and from said opening to admit and eject slices of bread, a housing shaped to be receivable in a bread slice and arranged in said oven to pierce and become embedded in a slice of bread admitted into the oven on said carrier, a thermo-bar in said housing, and means associated with said thermo-bar for controlling the flow of electricity to said heating element and for controlling the movement of said carrier in a direction to eject the bread from the oven.

25. In an automatic bread toaster provided with an oven having an opening for the admission and removal of slices of bread, heating means, a bread carrier movable toward and from said opening to admit and eject slices of bread, means for normally holding the carrier adjacent said opening, and a latching mechanism for holding said carrier away from said opening in position to fully admit a slice of bread to be toasted, a housing arranged in said oven to pierce and become embedded in a slice of bread admitted into said oven on the carrier, a thermo-bar in said housing, and means associated with the thermo-bar for releasing said latching mechanism.

26. A bread toaster having in combination, heating means, means for supporting a bread slice adjacent said heating means, a housing shaped to pierce a bread slice to be toasted and be received therein mounted on said supporting means, temperature responsive means in said housing, and means associated therewith for controlling the toasting action of said heating means on the bread slice.

27. In a bread toaster having heating means, and a carrier for moving bread slices toward and away from said heating means, a housing made of heat conducting material and shaped to be received in a bread slice, means for inserting said housing into a bread slice to be toasted, gripping means for holding a slice of bread fixed with respect to said carrier during the insertion of said housing therein, and temperature responsive means associated with said housing for controlling the toasting action of the heating means on the bread slice.

28. In a bread toaster having an oven, means for heating the oven, and a carrier for moving bread into and out of the oven, an elongated housing of heat conducting material disposed in said oven and having a pointed end in the path of a slice of bread being moved into the oven on said carrier, means associated with said carrier for gripping said slice during movement into the oven thereby to cause it to become pierced by said housing, said means being operative to release the slice upon completion of the movement of the carrier to completely insert it into the oven, and temperature responsive means associated with said housing for controlling the operation of the carrier upon completion of the toasting operation.

29. In a toaster having heating means, and a carrier for moving articles of solid food to be toasted toward and away from the heating means in a substantially fixed path of travel, a thermally responsive device having a pointed end adapted to be inserted in a food article on the carrier, said thermally responsive device being in the path of said carrier, a pair of jaws pivoted on the carrier, spring means for normally holding said jaws in expanded relation, cam means for contracting said jaws to grip the article being toasted during insertion of said thermally responsive device therein, said means being operative to release said jaws upon completion of the movement of the carrier in a direction to fully move an article to be toasted adjacent the heating means, and means associated with said thermally responsive device for controlling the operation of the carrier upon completion of the toasting operation.

30. In a bread toaster having an oven, means for heating the oven, and a bread carrier having a platform movable in the oven between a position of insertion and a position of ejection to admit and eject slices of bread, said platform having an opening therein, a thermally responsive device shaped to pierce a slice of bread fixed in said oven and extending through the opening in said bread carrier platform when the same is in inserted position, a pair of interconnected jaws pivoted on said carrier and adapted to grip a slice of bread thereon when contracted, resilient means for normally holding said jaws in expanded relation, an arm fixed on one of said jaws, a cam member shaped and positioned to be engaged by said arm during movement of the carrier toward inserted position thereby to contract said jaws, and to release said arm when the carrier reaches inserted position thereby to allow said jaws to expand, and means associated with said thermally responsive device for controlling the operation of the bread carrier upon completion of the toasting operation.
31. In a bread toaster having an oven, means for heating the oven, and a bread carrier movable in the oven between a position of insertion and a position of ejection to admit and eject slices of bread, a thermally responsive device shaped to pierce a slice of bread and arranged in said oven in the path of a slice of bread on the carrier thereby to pierce said slice and become embedded therein upon insertion thereof into the oven, a pair of jaws pivoted on said carrier and arranged to grip a slice of bread thereon when contracted, means for contracting said jaws during movement of the carrier in a direction to insert a slice of bread, means for holding said jaws expanded during movement of the carrier from inserted to ejected position, and means associated with said thermally responsive device for controlling the toasting action of the oven on the bread.

32. A bread toaster having in combination, heating means, means for supporting a slice of bread adjacent said heating means, thermally responsive means receivable within a bread slice to be toasted, and means associated therewith for controlling the toasting action of said heating means on the bread slice, said thermally respon- sive means being automatically compensating for ambient temperature changes and being responsive to the interior temperature of the bread slice.

33. A bread toaster having in combination, heating means, means for supporting a bread slice adjacent said heating means, a thermally responsive device receivable within a bread slice to be toasted, and means associated with said device for interrupting the toasting of the bread slice whereby the time of the toasting operation is controlled by the thermally responsive device, said thermally responsive device including means whereby it is compensated to prevent errors in timing due to increase of its temperature as a result of successive toasting operations without sufficient intervening time intervals to permit cooling to room temperature.

34. A bread toaster having in combination, heating means, means for supporting a bread slice adjacent said heating means, a thermally responsive device receivable within a bread slice to be toasted, and means associated with said device for interrupting the toasting operation whereby the timing of the toasting operation is controlled by the thermally responsive device, said device including means whereby it is compensated to give proper timing under temperature conditions resulting from successive toasting operations.

35. A bread toaster having in combination, heating means, means for supporting a bread slice adjacent said heating means, a housing so shaped as to be insertable into a bread slice to be toasted, a thermo-bar in said housing, and means associated with said thermo-bar for interrupting the toasting operation thereby to time the same, said thermo-bar including means whereby it is compensated to give proper timing under temperature conditions resulting from successive toasting operations.

36. A bread toaster having in combination, heating means, means for supporting a bread slice to be toasted adjacent said heating means, a housing so shaped as to be insertable into a bread slice to be toasted, an electrical circuit, a pair of contacts controlling said circuit, a thermo-bar fixed to the housing for moving one of said contacts in the direction of the other upon being heated, a second thermo-bar for moving away said contacts from the other upon being heated, and means associated with said electrical circuit for interrupting the toasting operation, said second thermo-bar compensating for temperature conditions resulting from successive toasting operations.

37. A bread toaster having in combination, heating means, means for supporting a bread slice to be toasted adjacent said heating means, a housing so shaped as to be insertable into a bread slice to be toasted, a strip of bimetal fixed in said housing at one end and twisted through substantially 180° intermediate of its two ends, a contact carried by said strip of bimetal at its other end, a second contact adapted to be engaged by the first said contact upon a heating up of the bread slice in which said housing is inserted, and means associated with said contacts for interrupting the toasting of said bread slice.

38. A bread toaster having in combination, heating means, means for supporting a bread slice adjacent said heating means, a temperature responsive device shaped to be insertable into a bread slice, means including members adapted to grip a bread slice for inserting the temperature responsive device therein, and means associated with said device for interrupting the toasting operation thereby to time the same, said thermally responsive device including means whereby it is compensated to give proper timing under temperature conditions resulting from successive toasting operations.

39. A bread toaster having in combination, heating means, means for supporting a bread slice to be heated adjacent said heating means, a housing so shaped as to be insertable into a bread slice to be toasted, means including members adapted to grip a bread slice for inserting the housing therein, a thermo-bar secured in said housing and twisted through substantially 180° intermediate its two ends, and means associated with the thermo-bar for interrupting the toasting of the bread slice.

40. A bread toaster having in combination, heating means, a carrier movable between positions of insertion and ejection to carry bread slices to and from said heating means, spring means for normally holding said carrier in position of ejection, a latch mechanism for holding the carrier in position of insertion, a temperature responsive device receivable in a bread slice to be toasted, and means associated with said device including a pivoted catch for tripping said latch mechanism.

41. A bread toaster having in combination, heating means, means for supporting a slice of bread adjacent said heating means, means receivable within a bread slice to be toasted for controlling the operating of said heating means, and means for adjusting said control means thereby to regulate the degree of toasting of the bread slice.

42. A bread toaster having in combination, heating means, means for supporting a slice of bread adjacent said heating means, a thermally responsive device shaped to pierce and be received in a bread slice, means for inserting said thermally responsive device into a bread slice to be toasted, means associated with said thermally responsive device for controlling the operation of said heating means, and means for adjusting said thermally responsive device thereby to regulate the degree of toasting of the bread slice.

43. A bread toaster having in combination, heating means, means for supporting a slice of bread adjacent said heating means, a housing shaped to pierce and become embedded in a bread slice to be toasted, a thermo-bar fixed to said housing, a first contact carried by said thermo-bar, a second contact adjustably positioned adjacent said first contact and adapted to be engaged thereby when the thermo-bar becomes heated, means for varying the position of the second contact with respect to the first contact, and means associated with said contacts for interrupting the bread toasting operation when the said contacts are in engagement.

44. A bread toaster having in combination, heating means, means for supporting a slice of bread adjacent said heating means, a housing shaped to pierce and become embedded in a bread slice to be toasted, a thermo-bar fixed in said housing at one end and twisted through substantially 180° intermediate of its ends, a first contact carried at its other end, a second contact adjustably positioned adjacent said first contact and adapted to be engaged thereby when the thermo-bar becomes heated, means for varying the position of the second contact with respect to the first contact, and means associated with said contacts for interrupting the toasting operation when the said contacts are in engagement.

45. A bread toaster having in combination, electrically operated heating means, an electrical circuit for said heating means, a switch in said circuit, a thermally responsive device shaped to be receivable in a bread slice to be toasted, means for inserting said thermally responsive device into a bread slice to be toasted and for closing said switch for the heating means, and means associated with said thermally responsive device for opening said switch.

46. A bread toaster having in combination, electrically operated heating means, an electrical circuit for the heating means, a switch in said circuit, a bread carrier movable between a position of ejection and a position of insertion to admit and eject slices of bread, spring means normally holding the carrier in position of ejection, latch means for holding the carrier in position of insertion, a thermally responsive device receivable in a bread slice to be toasted, means including members gripping the bread for inserting said thermally responsive device into a bread slice on the carrier, and means associated with said thermally responsive device for operating said latch means thereby to release the carrier from position of insertion.

47. A bread toaster having in combination, heating means, means for supporting a slice of bread adjacent said heating means, a relay, a thermally responsive device receivable in a bread slice to be toasted, means associated with said thermally responsive device for controlling the operation of the relay, and means associated with the relay for interrupting the toasting of a bread slice having said thermally responsive device inserted therein.

48. A bread toaster having in combination, electrically operated heating means, means for supporting a slice of bread adjacent said heating means, a thermally responsive device receivable in a bread slice to be toasted, a pair of contacts controlled by said device, an electrical circuit connecting the heating means to a source of power, a relay, electrical conducting means connecting said relay and the aforesaid contacts in parallel with the heating means, and means associated with said relay for interrupting the toasting of a bread slice having said thermally responsive device embedded therein.

49. A bread toaster having in combination, heating means, means for supporting a slice of bread adjacent said heating means, a relay having a pivoted armature adapted to assume a position out of alignment with its field when the field is de-energized and to rotate and align itself with the field upon energization thereof, a thermally responsive device receivable in a bread slice to be toasted, means associated with said thermally responsive device for controlling the operation of the relay, and means associated with the relay for interrupting the toasting of a bread slice having said thermally responsive device inserted therein.

50. A bread toaster having in combination, an oven, electrical resistance heating elements in said oven, a bread carrier movable in the oven between a position of insertion and a position of ejection to admit and eject slices of bread, spring means for normally holding the carrier in position of ejection, latch means for holding the carrier in position of insertion, an elongated housing of heat conducting material having a pointed end in the path of a bread slice being inserted into the oven on said carrier, bread grippers pivoted on said carrier, means for contracting said grippers thereby to cause them to grip the bread during movement thereof into the oven to hold the bread fixed with respect to the carrier during insertion of said housing therein, a thermo-bar twisted through substantially 180° intermediate of its two ends, said thermo-bar being fixed in said housing adjacent its pointed end, a first contact carried by said thermo-bar, a second contact adjustably mounted adjacent said first contact to be engaged thereby upon movement of the thermo-bar due to heating, means for adjusting said contacts relative to each other, a circuit connecting the heating elements to a source of power, a switch in said circuit, means connecting the bread carrier and switch for closing said switch upon movement of the carrier to admit a bread slice into the oven, and for opening the switch upon movement of the carrier to eject a bread slice from the oven, a relay, electrical conducting means connecting said relay and the aforesaid contacts in parallel with said heating elements, and means associated with the relay for tripping the aforementioned latch means.

51. In a bread toaster, an oven, heating means therefor, means for supporting a slice of bread in the oven while being toasted, a device responsive to the temperature of the inside of a slice of bread being toasted, and means controlled by said device for causing said bread supporting means to eject the bread when toasted.

52. A bread toaster having in combination, heating means, means for supporting a bread slice adjacent said heating means, a temperature responsive device positioned to be influenced by the temperature of a slice of bread being toasted for controlling the toasting operation, and said temperature responsive device comprising a thermo-bar having two portions, one of which warps in one direction when heated, and the other of which warps in the opposite direction when heated, and said thermo-bar in thermal contact with the bread at only one end thereof, whereby said device is compensated to give proper timing under temperature conditions resulting from successive toasting operations.

MAURICE H. GRAHAM.